(12) United States Patent
Yalcin et al.

(10) Patent No.: US 6,651,911 B1
(45) Date of Patent: *Nov. 25, 2003

(54) FUEL INJECTION VALVE FOR INTERNAL COMBUSTION ENGINES

(75) Inventors: Hakin Yalcin, Regensburg (DE); Gunter Lewentz, Regensburg (DE)

(73) Assignee: Siemens Aktiengesellschaft (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/674,762

(22) PCT Filed: May 5, 1999

(86) PCT No.: PCT/DE99/01356

§ 371 (c)(1), (2), (4) Date: Jan. 19, 2001

(87) PCT Pub. No.: WO99/57432

PCT Pub. Date: Nov. 11, 1999

(30) Foreign Application Priority Data

May 7, 1998 (DE) .......................... 198 20 456

(51) Int. Cl.[7] ................................ F02M 39/00
(52) U.S. Cl. ................... 239/533.3; 239/533.2
(58) Field of Search ............ 239/533.2, 533.3, 239/533.4, 533.5, 533.6, 533.7, 533.8, 533.9, 533.11, 533.12, 584, 88–96, 533.1

(56) References Cited

U.S. PATENT DOCUMENTS

| 1,973,215 | A | * | 9/1934 | Lyman |
| 2,338,584 | A | * | 1/1944 | Hoadley .................. 137/509 |
| 5,059,289 | A | * | 10/1991 | Gaskell |
| 5,207,385 | A | * | 5/1993 | Turner |
| 5,449,121 | A | * | 9/1995 | El-Darazi et al. |
| 5,826,801 | A | * | 10/1998 | Kobayashi et al. |
| 6,354,520 | B1 | * | 3/2002 | Yalcin .................. 239/533.11 |

FOREIGN PATENT DOCUMENTS

| GB | 962870 | 7/1964 |
| WO | WO 99/57433 | * 11/1999 |

* cited by examiner

Primary Examiner—Christopher Kim

(57) ABSTRACT

Fuel injection valve with a nozzle body having a central guide hole and, to the side of the guide hole, a supply channel curved in an approximately circular manner with a radius, both of which open into a pressure chamber, the supply channel being formed by an erosion device, and in another configuration the nozzle body having a step at its face end. The construction features give the nozzle body great pressure resistance.

6 Claims, 4 Drawing Sheets

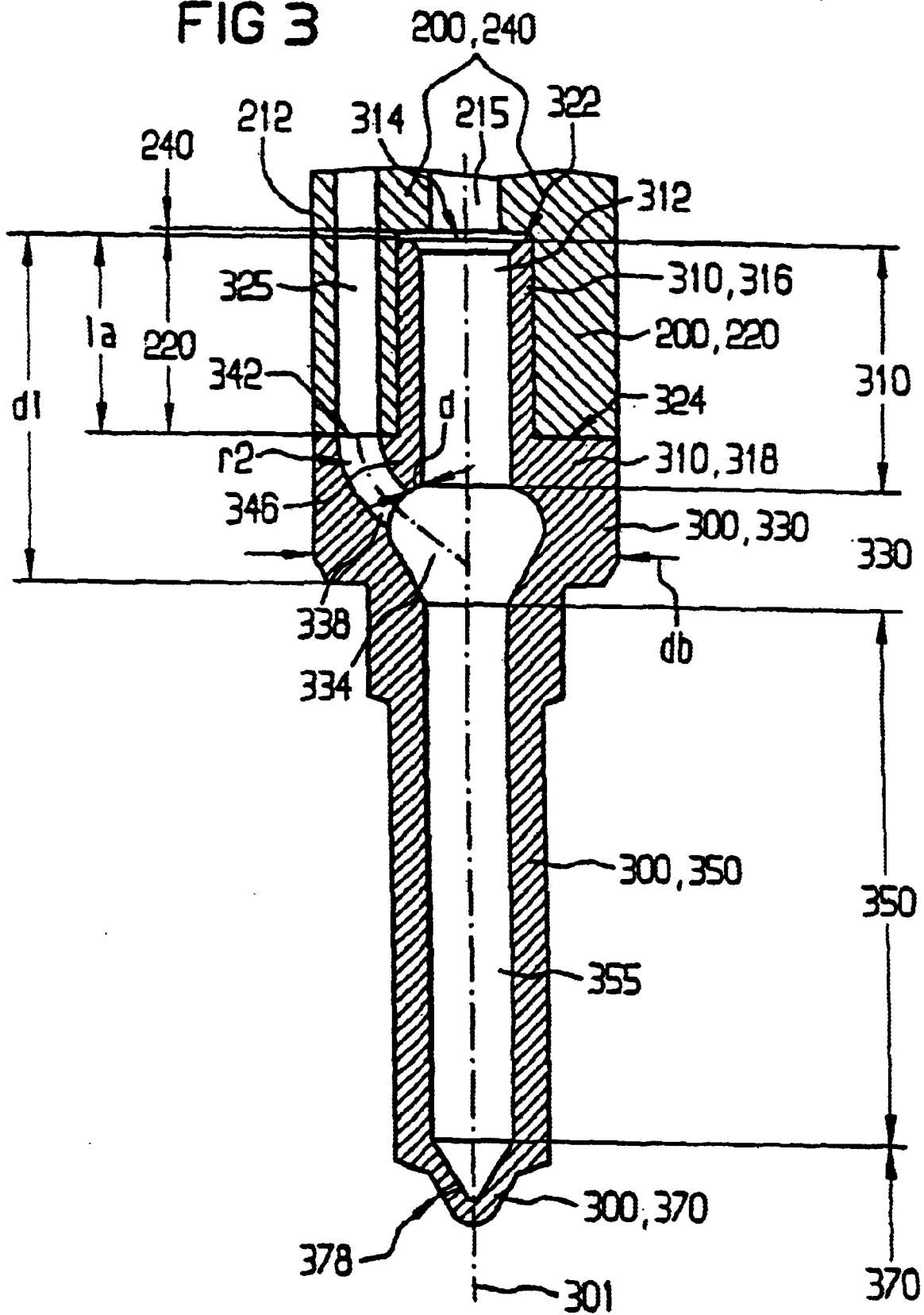

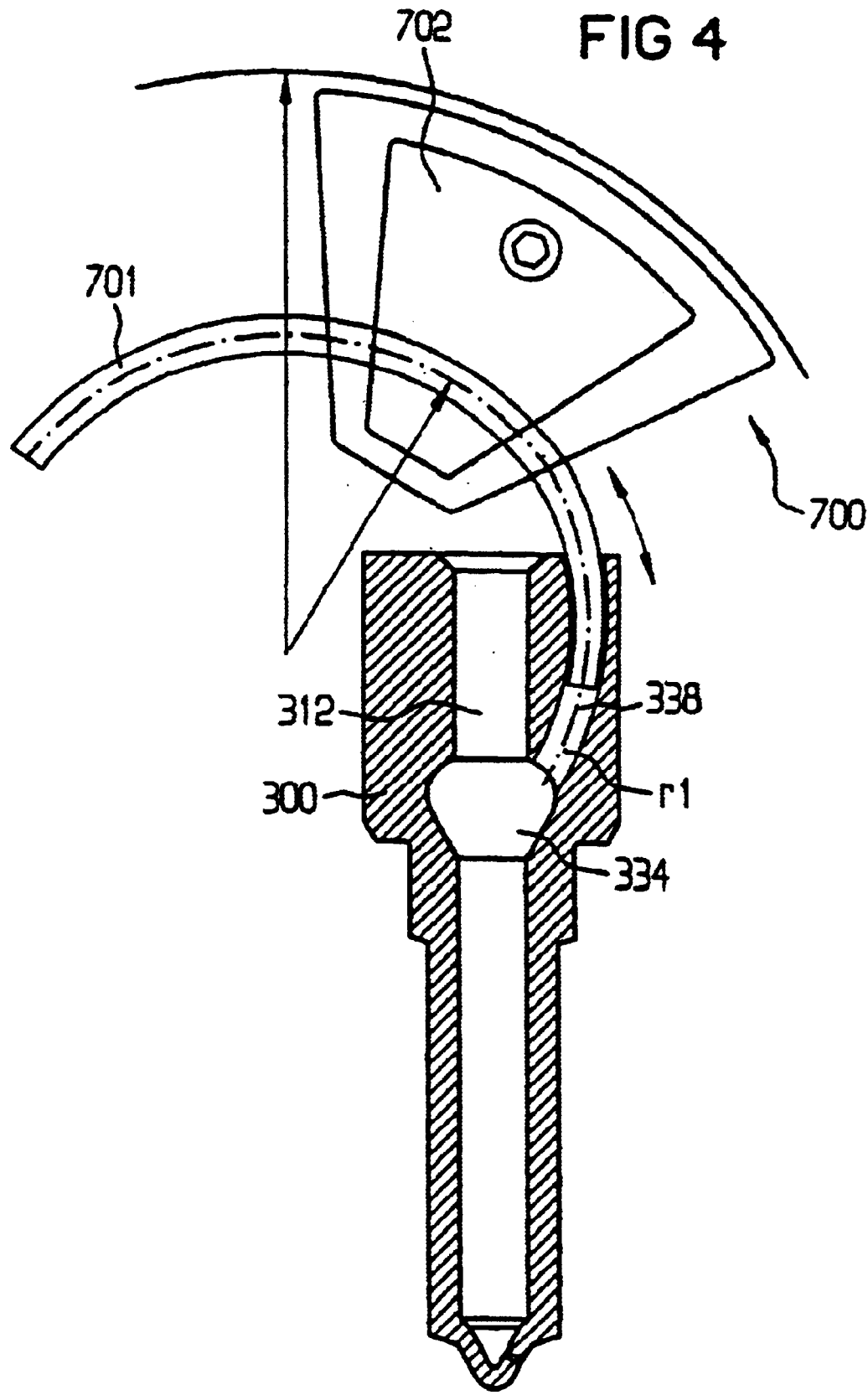

FUEL INJECTION VALVE FOR INTERNAL COMBUSTION ENGINES

The invention concerns a fuel injection valve and a production process.

This kind of fuel injection valve is known from the document EP 0 363 142 A1. In the nozzle body of the known fuel injection valve, the wall between the guide hole and the fuel supply channel is under an extremely high injection pressure. The fuel supply channel runs, starting from the face of the nozzle body, first essentially parallel to the guide hole before curving off in the direction of the pressure chamber and finally opening into the pressure chamber.

The task of the invention is to increase the pressure resistance of the fuel injection valve.

Further advantageous configurations and improvements offered by the invention are given in the sub-claims.

One advantage of the invention consists of increasing the pressure resistance of the nozzle body. Another advantage lies in the low cost of production.

A fuel injection valve, especially for diesel fuel, has to have high pressure resistance in order to withstand the high fuel pressure. The pressure resistance depends on the minimal wall thicknesses that can be achieved in the components of the fuel injection valve. The formation of a curved supply channel in the nozzle allows wall thickness to be increased in critical areas and hence provides high pressure resistance.

The invention is illustrated in more detail below in the figures:

FIG. 3 shows a longitudinal section of a second example of a nozzle body and an intermediate piece, and FIG. 4 shows a basic diagram of the method for producing a curved supply channel in a nozzle body.

Elements of the same construction or function generally have the same reference numbers in FIGS. 1 through 4.

Figure 1:
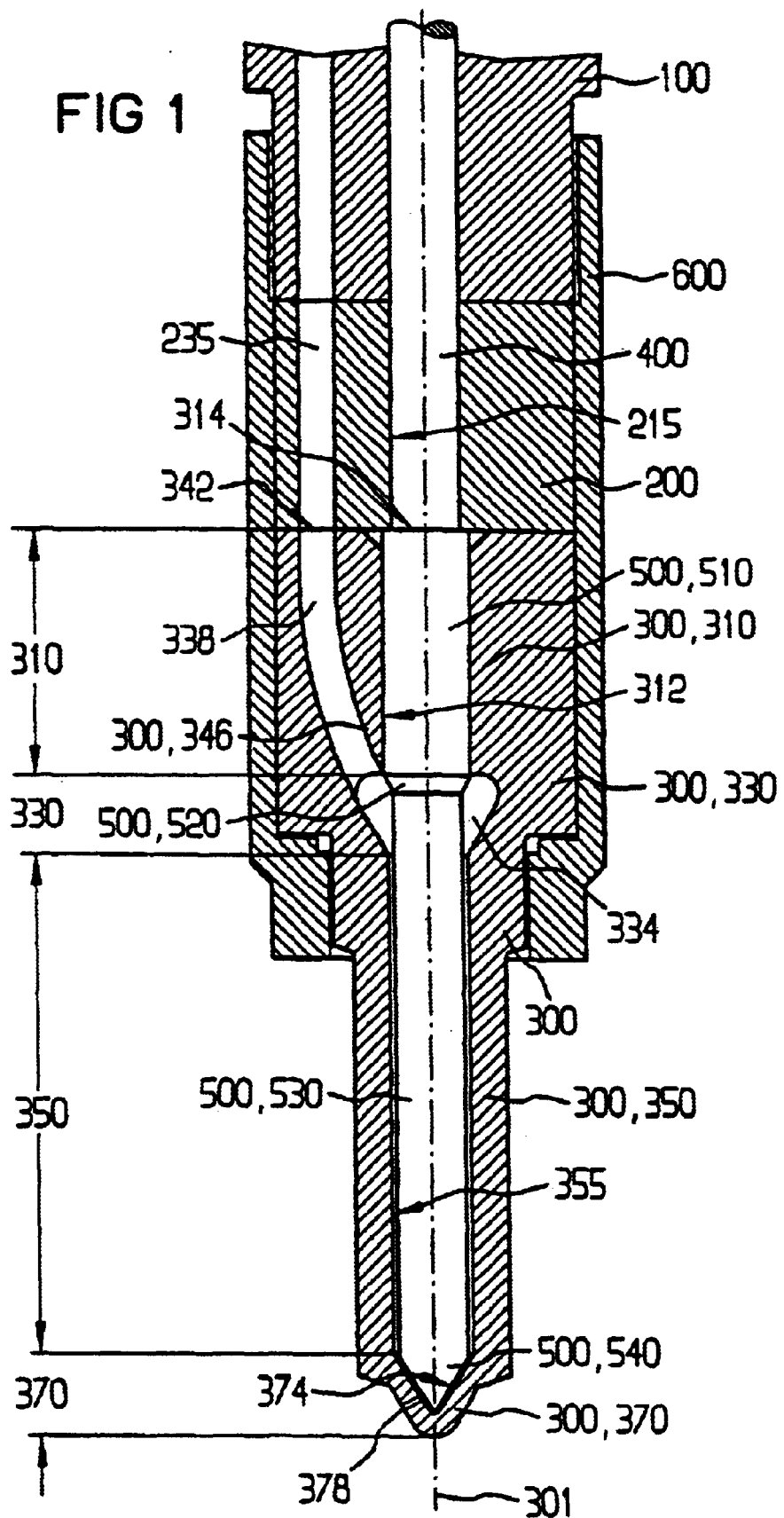
FIG. 1 shows a longitudinal section through part of a fuel injection valve.

The part of a fuel injection valve shown in FIG. 1 has nozzle body 300 with a rotationally symmetrical basic shape that is attached to nozzle holder body 100 by means of sleeve-shaped coupling ring 600 with intermediate piece 200 between them.

Nozzle body 300 is subdivided, from its face end in the direction of nozzle holder body 100, into the following sections: guide area 310, pressure chamber area 330, shaft area 350 and nozzle tip 370 that terminates nozzle body 300. The face end is configured as an annular area with its normal line being parallel to longitudinal axis 301 of the nozzle body.

Nozzle body 300 has a central nozzle body hole starting at its face end and ending at its nozzle tip 370, with a diameter and function that varies with the body sections of nozzle body 300. In the nozzle body hole there is nozzle needle 500 which is subdivided in the direction of nozzle tip 370 into guide plunger 510, ring collar 520, shaft plunger 530 and valve tip 540.

Guide area 310 has central guide hole 312 which serves to guide guide plunger 510 and which has hole opening 314 on the face of guide area 310.

Connected to guide area 310 is pressure chamber area 330 which has pressure chamber 334. Guide hole 312 opens into pressure chamber 334 into which guide plunger 510 is guided. Preferably, in pressure chamber 334, guide plunger 510 passes into conically tapered ring collar 520 which fits into shaft plunger 530.

To the side of guide hole 312 there is supply channel 338 which preferably opens into pressure chamber 334. Supply channel 338 has supply opening 342 on the face end of guide area 310 and is curved over its entire length. The curve is preferably formed in an approximate circle. The centerline of supply channel 338 forms a plane preferably running through longitudinal axis 301 of nozzle body 300.

Shaft area 350 connects to pressure chamber area 330 and has shaft hole 355 which connects to pressure chamber 334 and through which shaft plunger 530 runs.

Pressure chamber 334 is designed as a preferably symmetrical recess that is loopshaped in cross-section and which lies between guide hole 312 and shaft hole 355. In the area of the upper part of the loop, the wall of guide hole 312 makes an angle preferably in the 90° range with the wall of pressure chamber 334. In the area of the lower part of the loop, pressure chamber 334 converges conically and the wall of pressure chamber 334 passes at a flat angle into the wall of shaft area 350.

Conical nozzle tip 370 which has inside valve seat 374 for accepting valve tip 540 connects to shaft area 350. Nozzle tip 370 has at least one injection hole 378 through which the fuel is injected into the combustion chamber of the combustion engine. The axial movement of valve tip 540 controls the supply of fuel into the combustion chamber, with valve tip 540 closing off injection holes 378 and interrupting the flow of fuel to injection holes 378 in the neutral state. The fuel is guided in nozzle body 300 from supply channel 338 via pressure chamber 334, shaft hole 355 and valve seat 374 to injection holes 378.

The outside of nozzle body 300 is preferably stepped at the pressure chamber 334 level and at the shaft area 350 level, with the diameter of nozzle body 300 being reduced in the direction of valve tip 370.

Intermediate piece 200 is a hollow cylinder and has central plunger hole 215 to guide plunger 400 and supply channel 235 located to the side, preferably approximately parallel to plunger hole 215.

Intermediate piece 200 limits the lift of nozzle needle 500 since plunger hole 215 has a smaller diameter than guide plunger 510 of nozzle needle 500.

Plunger 400 transfers the axial movement produced by a control valve or an actuator to nozzle needle 500. Nozzle needle 500 exerts on plunger 400 a axial force in the direction of plunger 400 that is produced by the fuel pressure on ring collar 520 and on the active annular face at valve tip 540.

Figure 2:
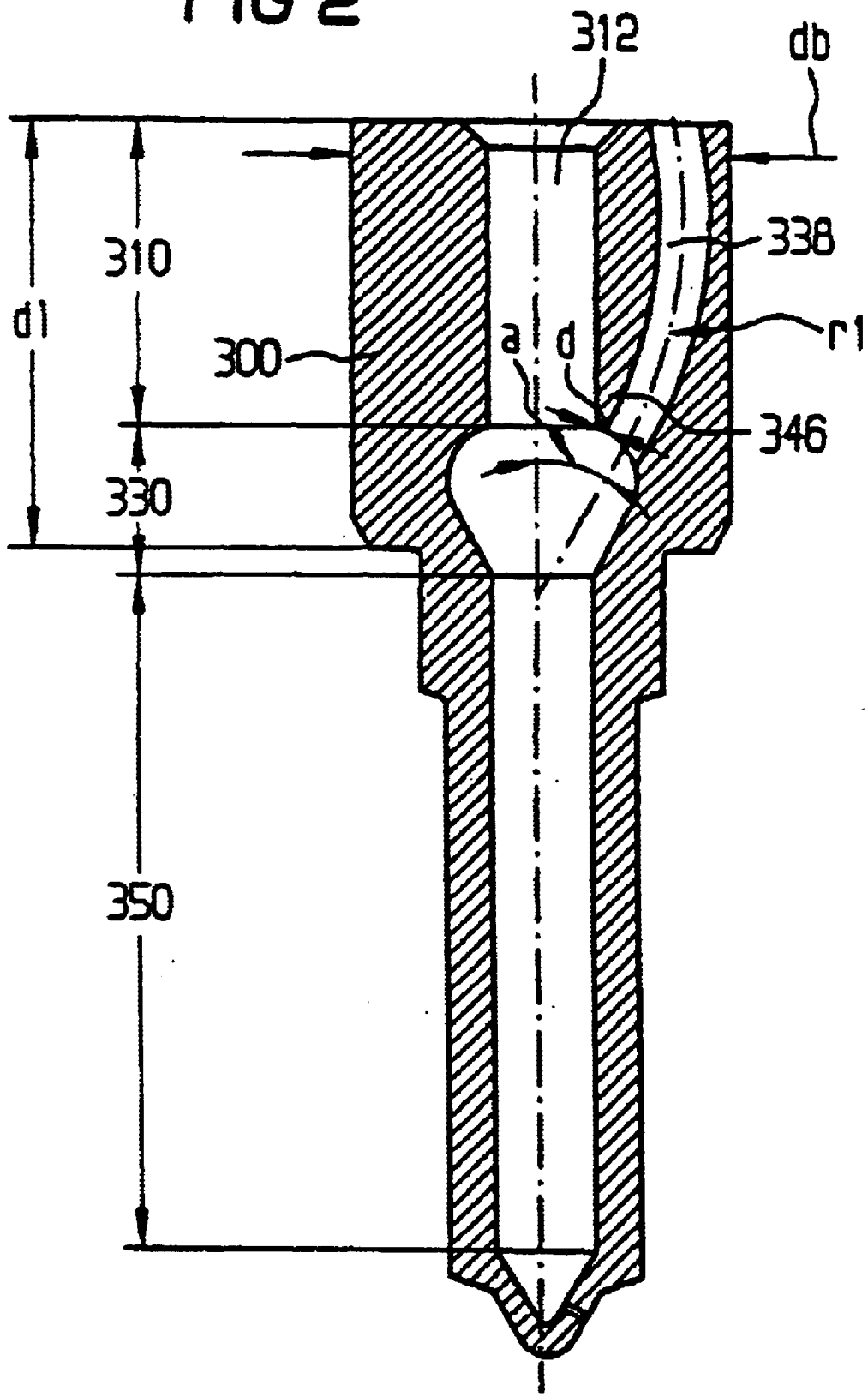
FIG. 2 shows a longitudinal section of a first example of embodiment of a nozzle body.

For illustration, some reference numbers from FIG. 1 are also listed in FIG. 2.

FIG. 2 shows details of the fuel injection valve from FIG. 1 with nozzle body 300, the supply channel 338 of which is preferably formed approximately in the shape of a circle by means of the erosion process described in FIG. 4. The curve of supply channel 338 at its centerline has a first radius r1.

The area lying between the shoulder at the level of pressure chamber 334 and the face end of guide area 310 is the flange area with flange length dl and flange diameter db at the pressure chamber 334 level.

Between supply channel 338 and guide hole 312 there is wall 346. At the openings of supply channel 338 and guide hole 312 into pressure chamber 334, wall 346 has the minimal thickness d. A large wall thickness d leads advantageously to a high pressure resistance of nozzle body 300. Supply channel 338 makes angle a with guide hole 312. Wall thickness d, depends, among other things, on angle a, first radius r1, flange diameter db and flange length dl.

The smaller the flange length dl at a given position of the shoulder at the pressure chamber 334 level and the greater the flange diameter db, the smaller the first radius r1 can be, which leads to a greater angle a and advantageously to a greater wall thickness d.

A preferred embodiment of the nozzle body from FIG. 2 has a flange diameter db of 14.3 mm and a flange length dl of approx. 15 mm. In this embodiment, the first radius r1 is between 30 and 50 mm, preferably approx. 35 mm. Angle a is roughly in the 30° to 40° range, preferably approximately 33°.

Other embodiments with different flange diameters db and flange lengths dl accordingly have different first radius r1 and angle a ranges. Preferably angle a is in the 30° to 40° range and initial radius is in the 30 to 50 mm range.

FIG. 3 shows another example of embodiment of nozzle body 300 with intermediate piece 200.

Unlike the example of embodiment from FIG. 2, guide area 310 is stepped by a step cut into upper body section 316 with annular face 322 and into lower body section 318 with annular shoulder area 324, with upper body section 316 placed at the face end of guide area 310. The normal lines of face area 322 and shoulder area 324 are preferably approximately parallel to longitudinal axis 301 of nozzle body 300. Upper body section 316 has a smaller diameter than lower body section 318. Face area 322 has hole opening 314 and shoulder area has supply opening 342.

The axial difference in height between face area 322 and shoulder area 324 is step length 1a.

The curve of supply channel 338 has at its centerline a second radius r2 which, with a given nozzle body 300 geometry, is smaller than the first radius r1 from FIG. 2. The length of supply channel 338 is shortened by the step, and this advantageously allows a faster and more cost-effective production to be achieved, e.g., with a production process described by means of FIG. 4.

The connection indicated in FIG. 2 between wall thickness d, angle a, first radius r1, flange diameter db and flange length dl applies correspondingly in the example of embodiment in FIG. 3, where the curve of supply channel 338 is here represented by second radius r2. There is also a connection with step length 1a: the larger step length 1a, the smaller second radius r2 can be, which leads to a greater angle a and advantageously to a greater wall thickness d.

This connection also applies to nozzle bodies configured differently from the shapes given in the examples.

One embodiment of the nozzle body from FIG. 3 has a flange diameter of 14.3 mm and a flange length of approx. 15 mm. Depending on step length 1a, second radius r2 is in the 5 to 10 mm range, preferably approx. 7 mm. Angle a is in the 40° to 70° range, preferably approx. 60°. The preferred form occurs at a step length of approx. 9 mm.

Other forms with differing flange diameters db and flange lengths dl have corresponding first radius r1 and angle a ranges. Preferably second radius r2 is in the 5 to 10 mm range and angle a is in the 40° to 70° range.

Intermediate piece 200 is divided in an axial direction into hollow cylindrical supply area 220 and hollow cylindrical plunger area 240 by a step cut on its inside facing plunger hole 215, with plunger area 240 having a smaller inside diameter than supply area 220. Plunger area 240 is located closer than supply area 220 to nozzle holder 100.

Supply channel 235 runs in the casing 212 of supply area 220 and plunger area 240 preferably approximately parallel to plunger hole 215.

The step in intermediate piece 200 ends at the guide area 310 step located at the face end of nozzle body 300. Supply channel 338 of nozzle body 300 connects to supply channel 235 of intermediate piece 200.

Locating face 324 of nozzle unit 300 lies level to the face area of intermediate piece 200. A connection that is resistant to high pressure develops due to the force of pressure between nozzle body 300 and intermediate piece 200.

FIG. 4 shows erosion device 700 with which approximately circular supply channel 338 is led into nozzle body 300. Erosion device 700 has erosion electrode 701 which is circular in shape to conform to the desired first or second radius r1, r2 of the curve in supply channel 338. Erosion electrode 701 is clamped in electrode holder 702 which is moved along the arc of a circle, with its centerpoint being the same as the centerpoint of the desired curve of supply channel 338. The diameter of erosion electrode 701 is only slightly smaller than the desired diameter of supply channel 338. Erosion electrode 701 is clamped into electrode holder 702 with a protrusion, the protrusion being somewhat greater than the length of supply channel 338.

With this process, it is advantageously possible to produce supply channel 338 exactly and in one work step.

Alternatively, it is possible to push curved erosion electrode 701 through a fixed, also curved electrode guide, which reduces the tendency of erosion electrode 701 to fluctuate, which advantageously leads to closer production tolerances. Erosion electrode 701 is guided to a minimal distance from nozzle body 300 during the performance of the erosion process. The metallic material of nozzle body 300 is removed by means of electrical discharge. This is a thermal removal process in which a succession of electrical discharges is used to remove metal material from nozzle body 300.

To produce the electrical discharges, a high voltage is applied between the erosion electrode and nozzle body 300 which are separated by an electrically isolating fluid and this voltage causes an electrical breakdown through the fluid. In the fluid, the breakdown produces a discharge path through which an electrical current flows and in which the temperature and pressure both remain high. There is a melting charge at erosion electrode 701 and nozzle body 300 and material is vaporized. The material thus removed is carried off by the fluid. The material of the erosion electrode consists preferably of tungsten, silver, hard metal or graphite. Water is preferably used as the fluid.

Pressure resistance can also be advantageously increased if the edges in the area of the lowest wall thickness d are also chamfered, e.g., via electrochemical rounding.

What is claimed is:

1. Fuel injection valve with a nozzle body having
   a guide area at a face end of the nozzle body, the guide area including a central guide hole,
   a pressure chamber area which connects to the guide area and has a pressure chamber into which the guide hole opens,
   a supply channel of the guide area which is located to a side of the guide hole and which opens into the pressure chamber, a nozzle holder body, and a hollow cylindrical intermediate piece disposed between the nozzle body and the nozzle holder body,
   characterized in that
   the entire supply channel of the guide area is curved,
   the guide area is stepped by a first step cut into an upper body section with a face and into a lower body section with a locating face,
   the guide hole has a hole opening on the face,
   the supply channel of the guide area has a supply opening on the locating face of the lower body section,
   the lower body section is closer than the upper body section to the pressure chamber area.

the upper body section has a smaller diameter than the lower body section, the hollow cylindrical intermediate piece has a central plunger hole for guiding a plunger and a supply channel of the intermediate piece to the side of the plunger hole, the supply channel of the guide area is curved in an approximately circular manner, and the intermediate piece at its side facing the plunger hole is divided by a step cut into a hollow cylindrical supply area and into a hollow cylindrical plunger area.

2. Fuel injection valve according to claim 1, characterized in that the curve in the supply channel of the guide area has a first radius at its centerline of between 30 mm and 50 mm.

3. Fuel injection valve according to claim 1, characterized in that an angle between the supply channel of the guide area at its opening into the pressure chamber and the guide hole is between 30° and 40°.

4. Fuel injection valve according to claim 1, characterized in that the curve in the supply channel of the guide area has a second radius at its centerline of between 5 mm and 10 mm.

5. Fuel injection valve according to claim 4, characterized in that an angle between the supply channel of the guide area at its opening to the pressure chamber and the guide hole is between 40° and 70°.

6. Fuel injection valve according to claim 1, characterized in that the plunger area is closer than the supply area to the nozzle holder body, the plunger area has a smaller inside diameter than the supply area, and the supply channel of the intermediate piece is located in a casing of the supply area and the plunger area.

\* \* \* \* \*